(12) United States Patent
Demuro et al.

(10) Patent No.: US 6,205,344 B1
(45) Date of Patent: *Mar. 20, 2001

(54) POWER ADAPTER WITH INTEGRAL RADIO FREQUENCY PORT

(75) Inventors: David M. Demuro, Snellville, GA (US); Mike M. Albert, Lincolnshire; John A. Kalenowsky, Palatine, both of IL (US); Robert Ford, Tamarac; Joseph Patino, Pembroke Pines, both of FL (US)

(73) Assignee: Motorola, Inc., Schaumburg, IL (US)

(*) Notice: Subject to any disclaimer, the term of this patent is extended or adjusted under 35 U.S.C. 154(b) by 0 days.

This patent is subject to a terminal disclaimer.

(21) Appl. No.: 08/485,932

(22) Filed: Jun. 7, 1995

Related U.S. Application Data

(62) Division of application No. 08/239,012, filed on May 6, 1994, now Pat. No. 5,488,649.

(51) Int. Cl.$^7$ .................................................. H04B 1/38
(52) U.S. Cl. ....................... 455/575; 455/90; 455/127; 455/571; 455/573
(58) Field of Search ............................ 379/58, 59, 441, 379/442; 455/33.1, 89, 90, 88, 126, 127, 234.1, 571, 575, 277.1, 277.2; 439/502, 638, 639, 916

(56) References Cited

U.S. PATENT DOCUMENTS

| | | |
|---|---|---|
| 3,076,155 | 1/1963 | Parker . |
| 4,109,988 | 8/1978 | Olson . |
| 4,179,670 | 12/1979 | Kingsbury . |
| 4,761,823 | 8/1988 | Fier . |
| 4,803,447 | 2/1989 | Schultz et al. . |
| 4,903,325 | 2/1990 | Yoshitake et al. . |
| 4,987,392 | 1/1991 | Clark . |
| 5,033,109 | * 7/1991 | Kawano et al. ........................ 455/90 |
| 5,047,674 | 9/1991 | Clark . |
| 5,048,117 | * 9/1991 | Aisaka et al. .......................... 455/89 |

(List continued on next page.)

FOREIGN PATENT DOCUMENTS

| | | |
|---|---|---|
| 389737 | 10/1990 | (EP) . |
| WO 90/10340 | 9/1990 | (WO) . |
| WO 92/14328 | 8/1992 | (WO) . |
| WO 95/13668 | 5/1995 | (WO) . |

OTHER PUBLICATIONS

Motorola Technical Developments, vol. 19, Jun. 1, 1993, pp. 25–26, Ford et al., "Method For Automatic RF Based on Presence of Antenna". Cited by French PTO Sep. 18, 1995.
"Field and Ware Electromagnetics," by cheng, David K., 1981, 2nd ed., p. 9.

Primary Examiner—Nay Maung
(74) Attorney, Agent, or Firm—John J. King; Daniel Collopy

(57) ABSTRACT

The present invention provides a power adapter (10) adapted to couple an external antenna (17) to a communication device (30) by way of a cable (12) which is typically plugged into a cigarette lighter of a vehicle or some other power source at one end, and an input connector of the communication device (30) at the other. In particular, the present invention provides a simple one-piece vehicle power adapter which also provides RF input/output capability for connection to an external vehicle antenna. According to certain aspects of the invention, the adapter can be configured to have a variety of selection mechanisms. For example, the communication device could include an RF switch (34) and control circuitry for selecting either the internal or external antenna for optimum reception. Alternatively, the power adapter could include an external switch (70) for allowing the user to select the desired antenna. Finally, the power adapter could include a component which automatically actuates the switch to select the external antenna when the external antenna is connected to the communication device.

2 Claims, 4 Drawing Sheets

U.S. PATENT DOCUMENTS

| | | |
|---|---|---|
| 5,060,293 | 10/1991 | Kok . |
| 5,103,195 | 4/1992 | Dunsmore . |
| 5,109,541 * | 4/1992 | Park ................................... 455/571 |
| 5,146,614 * | 9/1992 | Furuno ............................... 455/571 |
| 5,189,358 * | 2/1993 | Tomura et al. ...................... 455/89 |
| 5,261,121 | 11/1993 | Hashimoto . |
| 5,307,401 * | 4/1994 | Matsuda .............................. 379/59 |
| 5,313,514 * | 5/1994 | Kanasashi ........................... 379/58 |
| 5,333,177 * | 7/1994 | Braitberg et al. ................... 379/59 |
| 5,450,620 * | 9/1995 | Vaisanen ............................. 455/571 |
| 5,457,814 * | 10/1995 | Myrskog et al. .................... 455/571 |
| 5,551,067 * | 8/1996 | Hulkko et al. ...................... 455/571 |
| 5,555,450 * | 9/1996 | Sointula .............................. 455/571 |
| 5,659,893 * | 8/1997 | Enoki et al. ........................ 455/571 |

* cited by examiner

90

90

POWER ADAPTER WITH INTEGRAL RADIO FREQUENCY PORT

This application is a division of Ser. No. 08/239,012 filed May 6, 1994, now U.S. Pat. No. 5,488,649.

FIELD OF THE INVENTION

This invention relates to a power adapter for a portable device, and more particularly to a power adapter having an integral radio frequency port for communication equipment.

BACKGROUND OF THE INVENTION

In portable battery-powered equipment, such as a cellular telephone or other communication device, an external power supply is usually provided so that the user can operate the equipment from household current or vehicle power current in order to conserve battery power. To operate the communication device inside a vehicle, power adapters are commonly designed to fit into the cigarette lighter socket provided in the vehicle. The other end of the power adapter plugs into an external power input connector of the device, or includes what is commonly known in the industry as a "battery eliminator" which replaces a detachable battery coupled to the telephone or communication device.

When operating a cellular telephone or other communication device within a vehicle, it is generally desirable to use an antenna mounted external to the vehicle to improve the performance of the telephone. Some telephones provide a radio frequency (RF) input/output port in addition to the external power input port so that an external antenna may be utilized. However, such a device requires two separate connectors. In other telephones, the external power input port and the RF input/output port are combined within a single connector of the device. However, such a device would typically require that either an external power supply or external antenna be connected.

Accordingly, there is a need to provide a simple, single cable vehicle power adapter which also provides RF input/output capability for connection to an external vehicle antenna.

DESCRIPTION OF THE PREFERRED EMBODIMENTS

The present invention provides a power adapter for coupling an external antenna to a communication device by way of a cable which is typically plugged into a cigarette lighter of a vehicle or some other power source at one end, and an input connector of the communication device at the other end. In particular, the present invention provides a simple, single cable vehicle power adapter having a radio frequency (RF) input/output port for connection to an external vehicle antenna. According to certain aspects of the invention, the adapter can be configured to have a variety of antenna selection mechanisms. For example, the external antenna could be selected when the power adapter is attached to the communication device. Alternatively, the adapter could include an external switch for allowing the user to select the desired antenna. Finally, the adapter could include a switch associated with the RF port which automatically can cause the communication device to select the external antenna when the external antenna is connected to the adapter.

Figure 1:
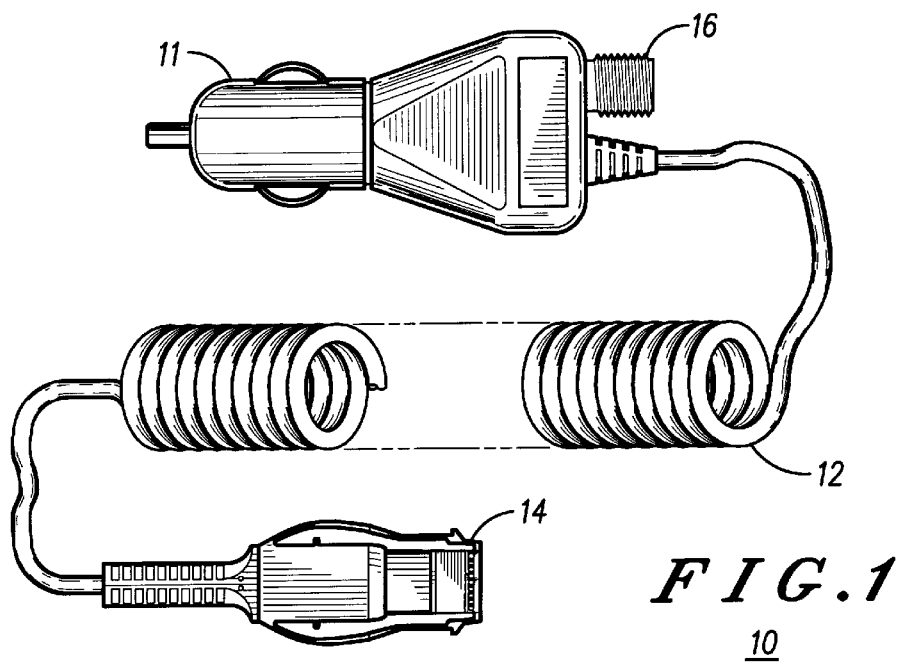
FIG. 1 is a perspective view of a power adapter having an integral RF port according to the present invention.

Turning first to FIG. 1, a perspective view of a power adapter according to the present invention is shown. Power adapter 10 includes a cigarette lighter adapter 11 which is commonly plugged into a cigarette lighter of a vehicle to receive power from the vehicle's electrical system. However, a source of power could also be supplied from a connector other than the cigarette lighter. A cable 12 is coupled between cigarette lighter adapter 11 and a connector 14. Connector 14 preferably is in inserted into a receptacle in the communication device adapted to receive the connector. Alternatively, connector 14 could be associated with a "battery eliminator" to replace a detachable battery which is coupled to the communication device to power the device. Finally, an external RF port 16 which is preferably associated with cigarette lighter adapter 11 is adapted to receive an antenna cable to transmit signals between the device and an external antenna of the vehicle. An RF transmission means is provided from external RF port 16 through cable 12 and connector 14 to the communication device.

Figure 2:
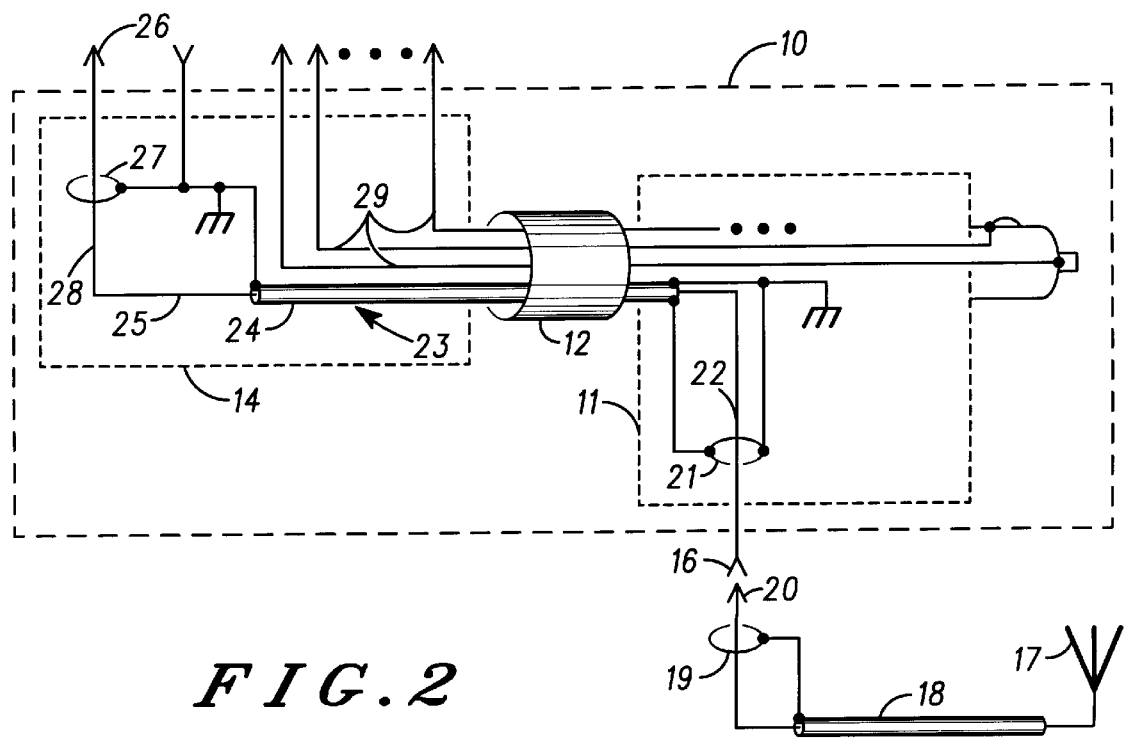
FIG. 2 is a schematic diagram of the power adapter of FIG. 1 coupled through an external connector to a transmission line and antenna.

Turning now to FIG. 2, a detailed schematic diagram of the power adapter is shown. In particular, the power adapter is attached to external antenna 17 by way of a transmission line 18 (preferably a coaxial cable) at a coaxial connector having an outer conductor 19 and an inner conductor 20. Cigarette lighter adapter 11 preferably includes a connector 16 which is also a coaxial connector. Connector 16 has an outer conductor 21 and an inner conductor 22 which are coupled to a transmission line 23 (preferably a coaxial cable) provided within cable 12. Transmission line 23 has an outer conductor 24 and an inner conductor 25 which are coupled to a coaxial connector 26 having an outer conductor 27 and an inner conductor 28. The power adapter 10 is coupled to a communication device, such as a cellular telephone, by way of connector 26. Finally, cable 12 could include other lines 29, such as power lines from cigarette lighter 11 to a communication device or data signals from an electronic control module in the vehicle.

Figure 3:
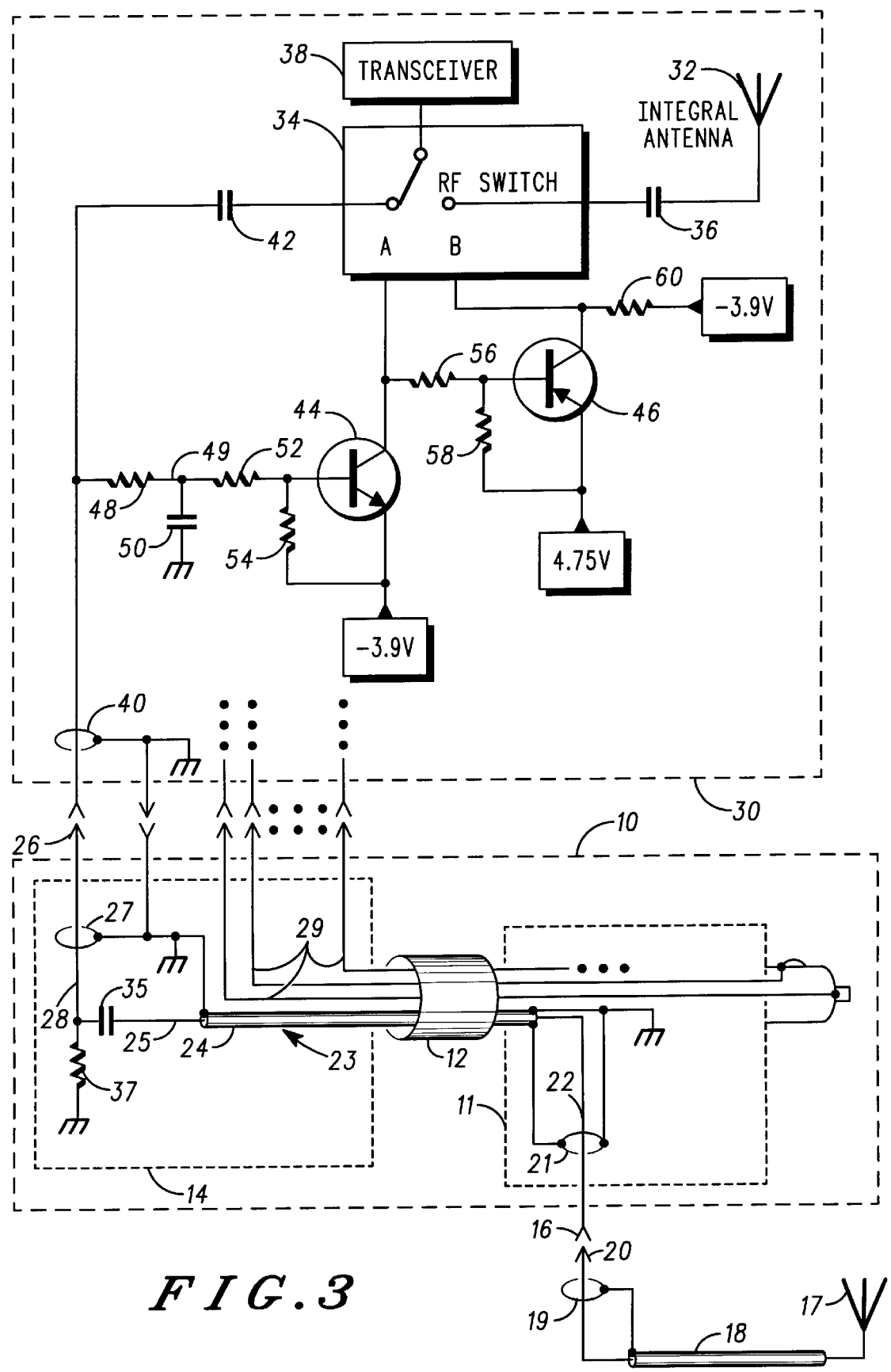
FIG. 3 is a schematic diagram of a power adapter of coupled between an external antenna and a communication device having an internal antenna and circuitry for selecting either the internal antenna or the external antenna.

Turning now to FIG. 3, a detailed schematic diagram shows power adapter 10 connected between an external antenna and a communication device 30. The power adapter is identical to the power adapter of FIG. 2, except that a direct current (DC) blocking capacitor 35 and a resistor 37 have been included. While only a relevant portion of the communication device circuitry for implementing this power adapter is shown, it is understood that other circuitry is required for the operation of the communication device. In order to couple RF signals to the external antenna connector 14 on the power adapter, the communication device must contain an RF switch means for selectively routing RF signals to either the phone's internal antenna or the external antenna port. In particular, communication device 30 generally includes an integral antenna 32 which is coupled to an RF switch 34 by a capacitor 36. The RF switch is coupled to the transceiver portion of the communication device and selects which antenna is connected to the transceiver. Preferably, the switch could couple the transceiver to an external antenna when the power adapter is applied. An example of a reliable electronic RF switch which could be employed in the circuit is disclosed in International Publication No. WO 96/13668 published 18 May 1995 by Mark Pennock and assigned to the assignees of the present invention and incorporated by reference herein.

In order for the RF switch to couple RF signals to the external antenna, the power adapter preferably provides a signal to communication device 30 indicating that the power adapter is attached and the external antenna should be used. The power adapter contains resistor 37 (preferably 10 kΩ) which is coupled to ground to provide this signal. While capacitor 35 and resistor 37 are shown proximal to inner conductor 28 of coaxial connector 26, the blocking capacitor could be positioned at any location along the inner conductor 25 of transmission line 23, and the resistor could be positioned at any location to provide a path to ground as long as it is on the side of the capacitor closer to coaxial connector 26. For example, the resistor and capacitor could be positioned within cigarette lighter adapter 11. As will be described in detail below, when the path to ground is provided by the resistor in the power adapter, circuitry in the communication device will couple the transceiver of the communication device to its external RF port 40 (and therefore, the external antenna). The communication device includes bipolar junction transistors (BJTs) 44 and 46 to control RF switch 34. According to the present invention, transistor 44 is preferably a NPN transistor and transistor 46 is preferably a PNP transistor. The circuit further includes a resistor 48 having a first end coupled to connector 40 and a second end coupled at a node 49 to a capacitor 50 coupled to ground. Resistor 48 and capacitor 50 are also coupled at node 49 to a resistor 52 which is coupled to the base of transistor 44. A resistor 54 is coupled between the base and the emitter of transistor 44 which is coupled to a negative voltage, preferably minus 3.9 volts. A resistor 56 is also coupled between the collector of transistor 44 (at switch control port A) and the base of transistor 46. A resistor 58 is coupled between the base and the emitter of transistor 46, which is coupled to a positive voltage, preferably 4.75 volts. Finally, a resistor 60 is coupled between the collector of transistor 46 (at switch control port B) and a negative voltage, preferably minus 3.9 volts. While the specific transistor switching arrangement of FIG. 3 is one example of a circuit which could be used to switch between an internal and an external antenna, other circuits could be employed within the scope of the present invention. For example, metal oxide semiconductor (MOS) transistors or different reference potentials could be employed.

Having described the preferred structure of the switch control circuit, the operation of the circuit will now be described. Resistor 37 of the power adapter activates the RF switch 34 when the power adapter is plugged into the external RF port of the transceiver at connector 40. In particular, resistor 37 pulls the base of transistor 44 up to approximately 0 volts which turns on transistor 44, thus applying a negative voltage to RF switch control port A. The base of transistor 46 is also pulled low by the collector of transistor 44, thereby turning on transistor 46 to apply a positive voltage to RF switch control port B. When a negative voltage is applied to RF switch control port A and a positive voltage is applied to RF switch control port B, RF signals are routed from the transceiver to the external RF port 40 of the communication device 30.

If the male connector 14 is removed from the external RF port 40 of the communication device, the base of transistor 44 is pulled to the emitter of transistor 44, effectively turning transistor 44 off to produce a high voltage at control port A of RF switch 34. Transistor 46 is turned off by the high voltage at its base, thus applying a negative voltage to RF switch control port B of the RF switch. When a positive voltage is applied to RF switch control port A and a negative voltage applied to control port B, RF power will be routed from the receiver/transmitter to the integral antenna of the transceiver.

Figure 4:
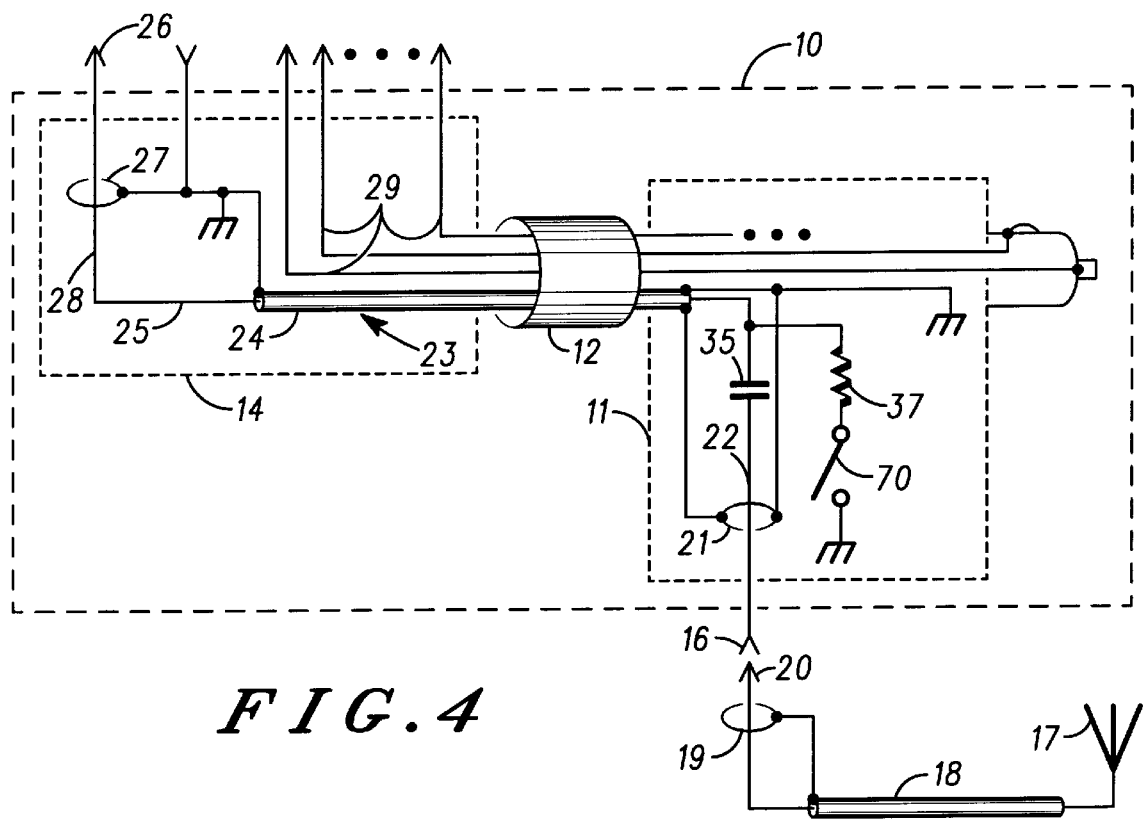
FIG. 4 is a block diagram of an alternate embodiment of a power adapter according to the present invention having an external, user selectable switch for selecting which antenna is coupled to the transceiver of the communication device.

According to another aspect of the invention, it is possible to modify the design the power adapter to include a user-selectable switch for determining whether or not RF signals should be coupled to the external connector. In particular, FIG. 4 shows the power adapter with resistor 37 and a user-selectable switch 70 for allowing RF power to be coupled either to the portable's integral antenna or the external antenna at the user's discretion. By closing switch 70, the circuitry in communication device 30 is actuated as described above to route the RF signals from transceiver 38 to external RF port 40 of the communication device. If switch 70 is left open, the same effect of removing connector 14 from external port 40 of communication device 30 as described above occurs and the RF signals will be coupled from transceiver 38 to integral antenna 32. The adapter of FIG. 4 can be used with a communication device having circuitry as shown in FIG. 3.

Figure 5:
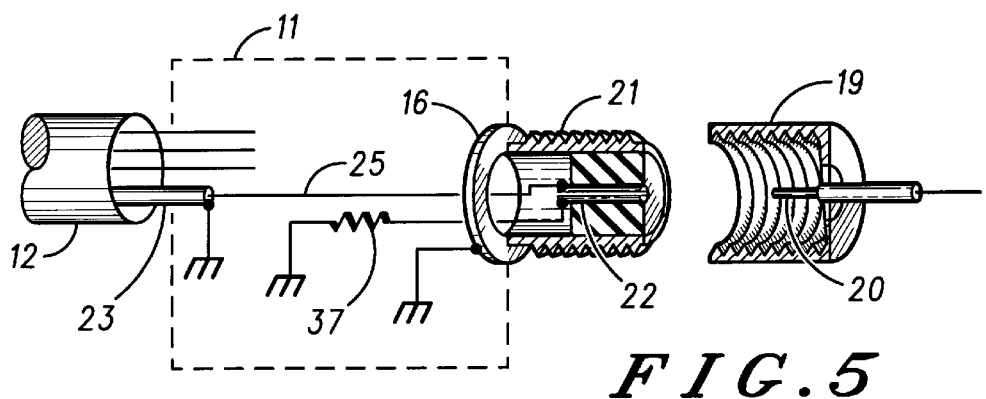
FIG. 5 is a schematic diagram of a connector 16 of a power adapter for automatic selection of an external antenna according to the present invention.

According to another aspect of the present invention, a connector could be used wherein the RF signals are automatically coupled to the external antenna when the external antenna is connected to the external RF port power aoaDter. FIG. 5 shows the preferred connector 16 of power adapter 10 for allowing automatic RF port selection. In particular. the female mini-UHF antenna connector 22 is specifically designed with a split center conductor socket, the two halves of which are normally electrically isolated. One half of the socket is connected normally to inner conductor 25 of transmission line 23. The other halt of the socket is connected to resistor 37 which is coupled to ground. When the user plugs in a standard external antenna, two halves of the center conductor socket are connected by the male end 20 of the external antenna plug. This causes a connection to ground to be established through a resistor 37 which actuates the switch control circuitry of the communication device to couple RF signals to the external antenna as described above. Accordingly, RF signals are automatically coupled to the external antenna when the external antenna is connected.

Figure 6:
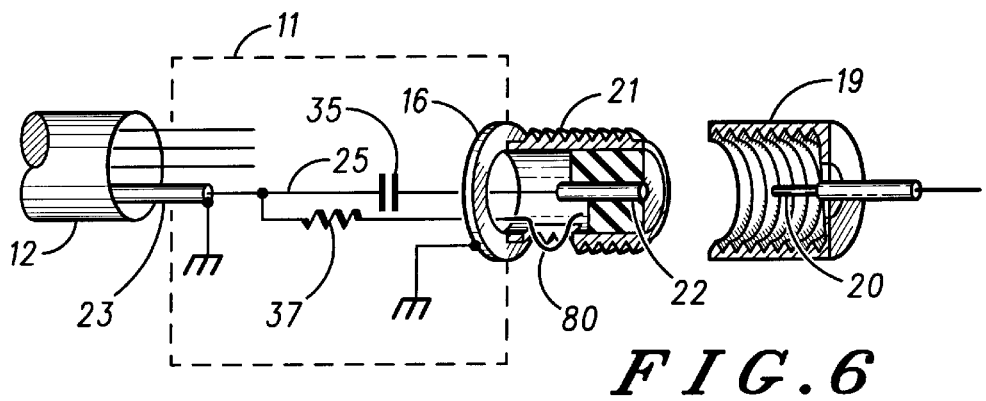
FIG. 6 is a schematic diagram of an alternate embodiment of a connector 16 of a power adapter for automatic selection of an external antenna according to the present invention.

Turning now to FIG. 6, an alternate embodiment of connector 16 of power adapter 10 for allowing automatic RF port selection is shown. In the alternate embodiment, an additional contact 80 is integrally associated with connector 16. Additional contact 80 is normally electrically isolated from outer conductor 21 of connector 16. The additional contact 80 is coupled to a resistor 37, the other end of which is coupled to inner conductor 25 of transmission line 23. Between that coupling point and inner conductor 22 of connector 16, there is also disposed a DC blocking capacitor 35. When a standard coaxial antenna is connected, outer conductor 19 of the connector for the external antenna couples additional contact 80 to the outer conductor 21 of connector 16, completing the path to ground through resistor 37, wherein RF signals are automatically coupled to the external antenna. The connectors of FIG. 5 and FIG. 6 allow the user to operate the power adapter and utilize the integral antenna of the communication device if so desired, by simply not connecting an external antenna.

Figure 7:
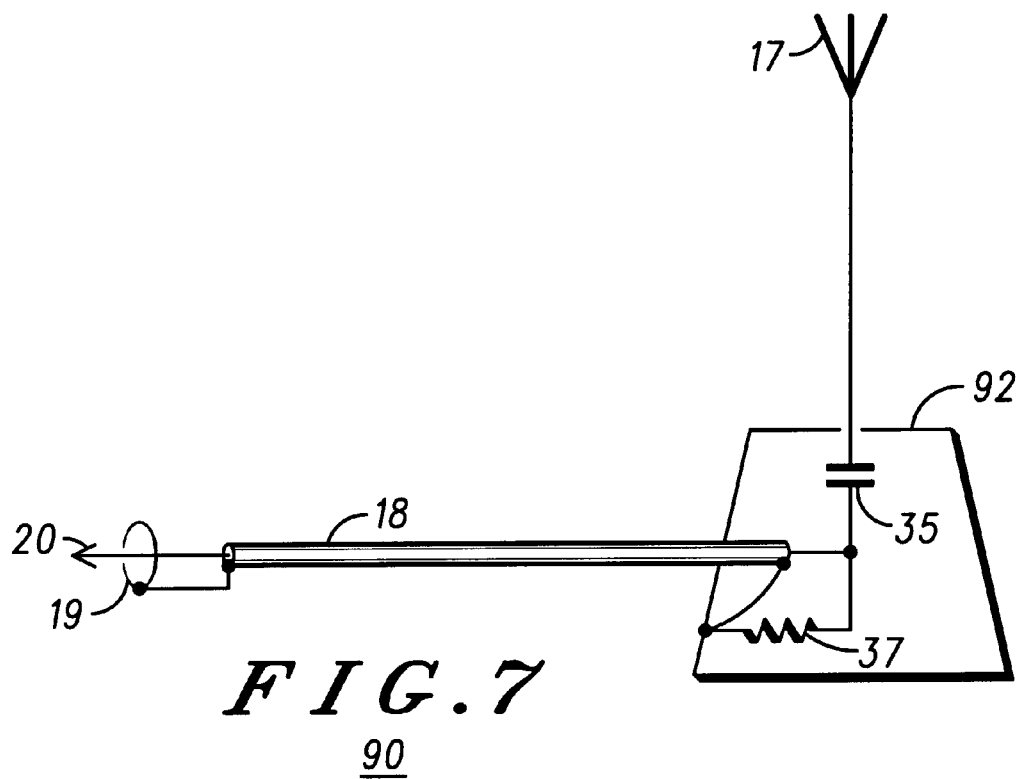
FIG. 7 is a schematic diagram of an antenna adapted to be coupled to the power adapter of FIG. 2.

Turning now to FIG. 7, a preferred external antenna 90 which could be coupled to the power adapter of FIG. 2 is shown. In particular, the antenna of FIG. 7 incorporates DC blocking capacitor 35 and resistor 37 which provides a path to ground. Therefore, when the external antenna is connected, the communication device will automatically couple RF signals through the adapter assembly to the external antenna as described above. Antenna base 92 may incorporate a magnet or window clip to attach the antenna to the vehicle.

Figure 8:
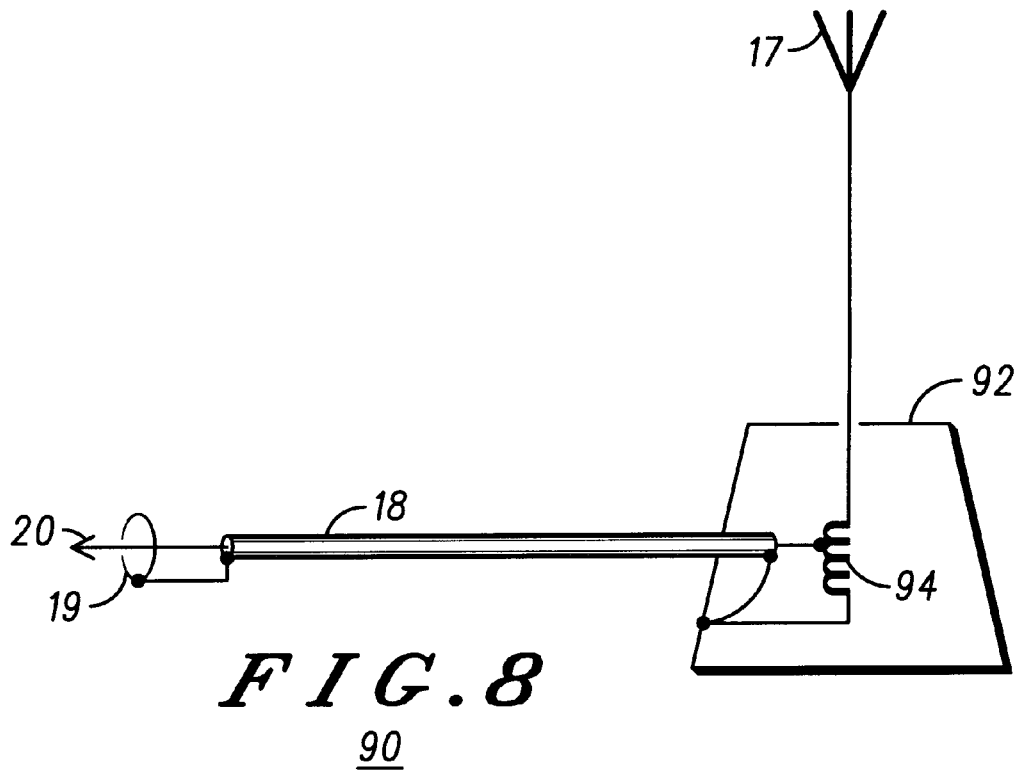
FIG. 8 is a schematic diagram of an antenna adapted to be coupled to the power adapter of FIG. 2.

Turning now to FIG. 8, an alternate embodiment of an external antenna to be coupled to the power adapter of FIG. 2 is shown. External antenna 90 includes a loading coil 94 which acts as an autotransformer to provide impedance matching between the antenna 17 and the transmission line 18. Because of the construction of the loading coil, a direct current path to ground is provided which will cause the circuitry in the communication device to couple RF signals through the adapter assembly to the external antenna.

In summary, the present invention provides a simple device for coupling both power and RF signals from a cigarette lighter adapter to a communication device by way of a single cable. Accordingly, the invention simplifies the connection of an external antenna to a portable cellular telephone employing such a power adapter. Also, the power adapter can be configured to allow for the selection of the external antenna by selectively employing an resistor in the adapter, or in the external antenna, to effect the coupling of RF signals to the external antenna.

What is claimed is:

1. A communication device for transmitting and receiving communication signals, said communication device comprising:

a transceiver circuit operative to transmit and receive communication signals;

an integral antenna integrally associated with said communication device;

a switching circuit coupled between said transceiver circuit and said integral antenna for decoupling said integral antenna from said transceiver circuit in response to a decoupling signal; and an adapter selectively couplable to said transceiver circuit and said switching circuit, said adapter having a radio frequency port operative to receive an external antenna for coupling radio frequency signals to said transceiver circuit, wherein said external antenna includes a resistor coupled to ground, said resistor pulling a node of said adapter to a predetermined value for generating said decoupling signal when said external antenna is attached to said adapter, and wherein said adapter, when said external antenna is attached to said radio frequency port, is operative for providing said decoupling signal to said switching circuit and is operative for automatically coupling said external antenna to said transceiver circuit.

2. A communication device for transmitting and receiving communication signals, said communication device comprising:

a transceiver circuit operative to transmit and receive communication signals;

an integral antenna integrally associated with said communication device;

a switching circuit coupled between said transceiver circuit and said integral antenna for decoupling said integral antenna from said transceiver circuit in response to a decoupling signal; and an adapter selectively couplable to said transceiver circuit and said switching circuit, said adapter having a radio frequency port operative to receive an external antenna for coupling radio frequency signals to said transceiver circuit, wherein said adapter includes a resistor coupled between a node of said adapter and ground, said resistor pulling said node of said adapter to a predetermined value for automatically generating said decoupling signal when said adapter is coupled to said transceiver circuit and said switching circuit.

* * * * *